(12) United States Patent
Yoshino et al.

(10) Patent No.: US 11,129,452 B2
(45) Date of Patent: Sep. 28, 2021

(54) SLIDER COVER

(71) Applicant: YKK Corporation, Tokyo (JP)

(72) Inventors: Tetsuya Yoshino, Novi, MI (US); Tsutomu Yamada, Novi, MI (US)

(73) Assignee: YKK Corporation, Tokyo (JP)

( * ) Notice: Subject to any disclaimer, the term of this patent is extended or adjusted under 35 U.S.C. 154(b) by 14 days.

(21) Appl. No.: 16/629,434

(22) PCT Filed: Jul. 5, 2018

(86) PCT No.: PCT/IB2018/054979
§ 371 (c)(1),
(2) Date: Jan. 8, 2020

(87) PCT Pub. No.: WO2019/012390
PCT Pub. Date: Jan. 17, 2019

(65) Prior Publication Data
US 2020/0178653 A1   Jun. 11, 2020

Related U.S. Application Data

(60) Provisional application No. 62/530,510, filed on Jul. 10, 2017.

(51) Int. Cl.
*A44B 19/26* (2006.01)
*A44B 19/30* (2006.01)
*A45C 13/10* (2006.01)

(52) U.S. Cl.
CPC .......... *A44B 19/262* (2013.01); *A44B 19/305* (2013.01); *A45C 13/103* (2013.01)

(58) Field of Classification Search
CPC ..... A44B 19/262; A44B 19/305; A44B 19/26; A44B 19/30; A45C 13/103; A45C 13/1023; Y10T 24/2507
See application file for complete search history.

(56) References Cited

U.S. PATENT DOCUMENTS 2,042,105 A * 5/1936 Kelley .................. H01R 25/14
191/23 R
2,344,049 A * 3/1944 Morin .................... A44B 19/26
24/385

(Continued)

FOREIGN PATENT DOCUMENTS

EP     1941810 A1    7/2008
WO  2014-091585 A1  6/2014

OTHER PUBLICATIONS

International Search Report, PCT Patent Application No. PCT/IB2018/054979, dated Oct. 18, 2018.

(Continued)

*Primary Examiner* — Jack W Lavinder
(74) *Attorney, Agent, or Firm* — Kilpatrick Townsend & Stockton LLP

(57) ABSTRACT

A slider cover includes a body having a first end and a second end opposite the first end. The first end and the second end of the body are arranged in a direction of travel of the slider cover. The slider cover includes a first slider-receiving area at the first end. A centerline of the first slider-receiving area extends at a non-parallel angle with respect to a horizontal plane of the slider cover. The slider cover also includes a second slider-receiving area at the second end. A centerline of the second slider-receiving area extends at a non-parallel angle with respect to the horizontal plane of the slider cover.

18 Claims, 15 Drawing Sheets

(56) References Cited

U.S. PATENT DOCUMENTS

| | | | | | |
|---|---|---|---|---|---|
| 2,351,803 | A | * | 6/1944 | Best | G05G 1/085 49/351 |
| 2,353,086 | A | * | 7/1944 | Schaaff | A44B 11/26 89/36.14 |
| 2,365,578 | A | * | 12/1944 | Morin | F41A 9/54 89/36.14 |
| 2,392,685 | A | * | 1/1946 | Morin | F41A 27/10 24/385 |
| 2,394,732 | A | * | 2/1946 | Williams | F41A 27/10 24/385 |
| 3,319,743 | A | * | 5/1967 | Pelavin | A44B 19/301 190/120 |
| 4,027,361 | A | * | 6/1977 | Yoneya | A44B 19/26 24/385 |
| 4,979,702 | A | * | 12/1990 | Franklin | A44B 19/26 244/129.4 |
| 5,117,883 | A | * | 6/1992 | Chen | A45C 3/00 150/118 |
| 7,464,569 | B2 | * | 12/2008 | Kolton | B65D 33/25 70/57.1 |
| 7,516,523 | B2 | * | 4/2009 | Okot | A44B 19/262 24/382 |
| 2008/0196217 | A1 | * | 8/2008 | Eschbach | A44B 19/262 24/386 |
| 2010/0192333 | A1 | * | 8/2010 | Vogelsang | A44B 19/26 24/400 |
| 2013/0134751 | A1 | | 5/2013 | Jammalamadaka | |
| 2019/0090596 | A1 | * | 3/2019 | Huyke-Phillips | B65D 33/2591 |

OTHER PUBLICATIONS

Written Opinion, PCT Patent Application No. PCT/IB2018/054979, dated Oct. 18, 2018.

International Preliminary Report on Patentability, PCT Patent Application No. PCT/IB2018/054979, dated Jan. 23, 2020, 8 pages.

* cited by examiner

SLIDER COVER

FIELD OF THE INVENTION

This application relates to slider covers and, more particularly, to slider covers for supporting sliders at predetermined angles.

BACKGROUND

A fastener tape is used to secure two pieces of fabric or other flexible material, such as on a garment, bag, passenger seat, or other article. A slider engages with elements located on tapes to open and close the fastener tape. In some cases, the fastener tape is used to conceal an opening or slot formed in a covering layer such as a covering layer of a passenger seat. Sometimes, the fastener tape concealing the opening or slot extends in at least two planes (e.g., in the x-direction, y-direction, and z-direction).

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a slider cover includes a body having a first end and a second end opposite the first end. The first end and the second end are arranged in a direction of travel of the slider cover. In various examples, the slider cover includes a first slider-receiving area at the first end that has a centerline extending at a non-parallel angle with respect to a horizontal plane of the slider cover. In some examples, the slider cover also includes a second slider-receiving area at the second end that has a centerline extending at a non-parallel angle with respect to the horizontal plane of the slider cover.

According to certain examples, a slider cover assembly includes the slider cover, a first slider retained by the first slider-receiving area, and a second slider retained by the second slider-receiving area.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
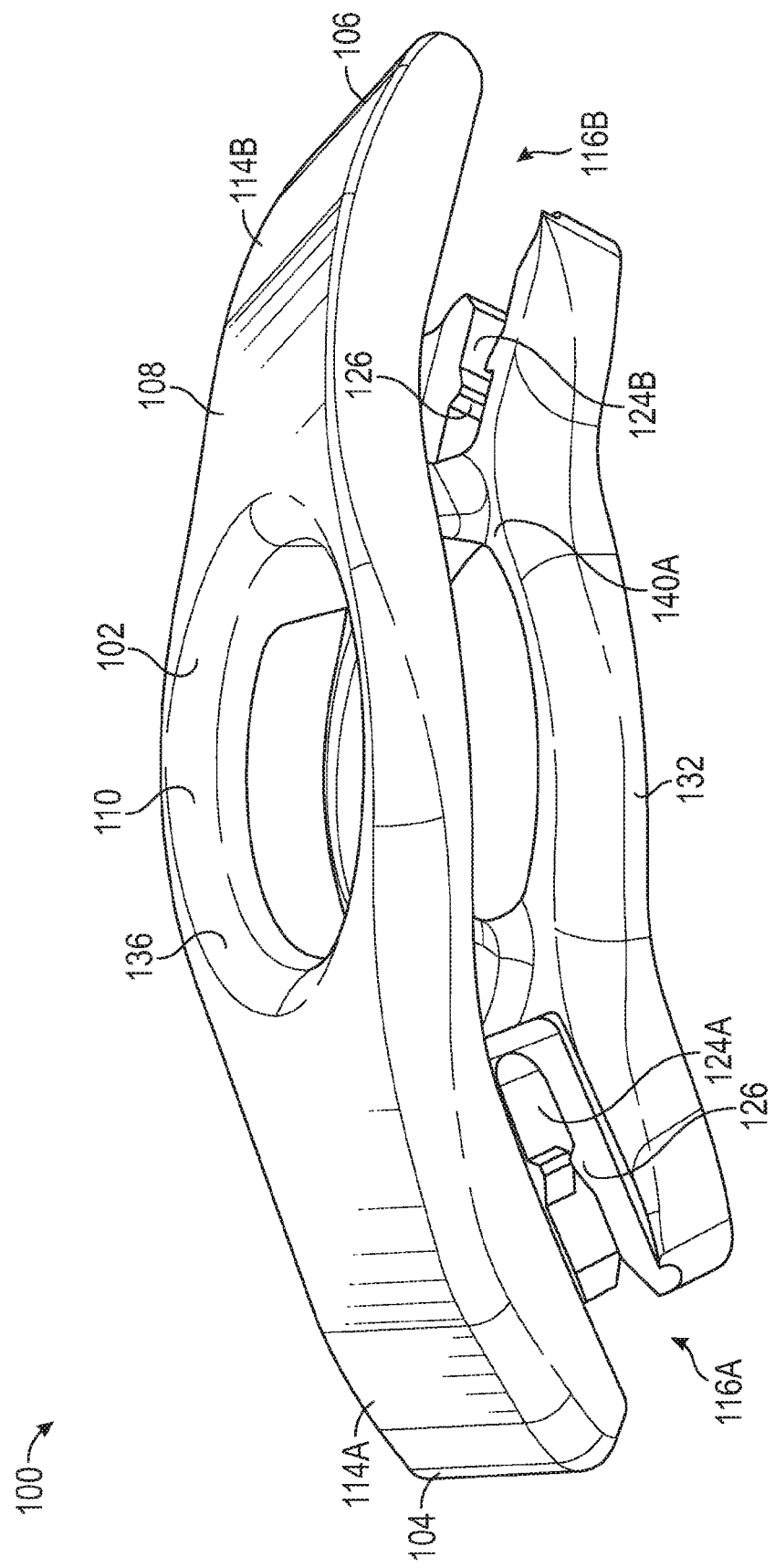
FIG. 1 is a perspective view of a slider cover according to aspects of the current disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," and "back," among others are intended to refer to the orientation as illustrated and described in the figure (or figures) to which the components and directions are referencing.

In one aspect, disclosed is a slider cover for sliders for a fastening tape that is curved and/or extends in at least two planes, and associated methods, systems, devices, and other apparatuses. The slider cover includes a body having a first end and a second end that are arranged in a direction of travel of the slider cover. The slider cover also includes a first slider-receiving area and a second slider-receiving area. The first slider-receiving area includes a centerline extending at a non-parallel angle with respect to a horizontal plane of the slider cover. The second slider-receiving area includes a centerline extending at a non-parallel angle with respect to the horizontal plane of the slider cover. According to certain examples, a slider cover assembly includes the slider cover, a first slider retained by the first slider-receiving area, and a second slider retained by the second slider-receiving area.

FIGS. 1-8 illustrate an example of a slider cover 100. The slider cover 100 includes a body 102 having a first end 104 and a second end 106. The first end 104 and the second end 106 are arranged in a direction of travel of the slider cover 100. A top surface 108 extends from the first end 104 to the second end 106. A middle portion 110 of the body 102 is between the first end 104 and the second end 106. In some examples, the top surface 108 at the middle portion 110 is elevated relative to the first end 104 and the second end 106 (see FIG. 2). In certain examples, the top surface 108 and/or a bottom surface 138 of the body 102 are arcuate shaped, although they need not be.

Figure 2:
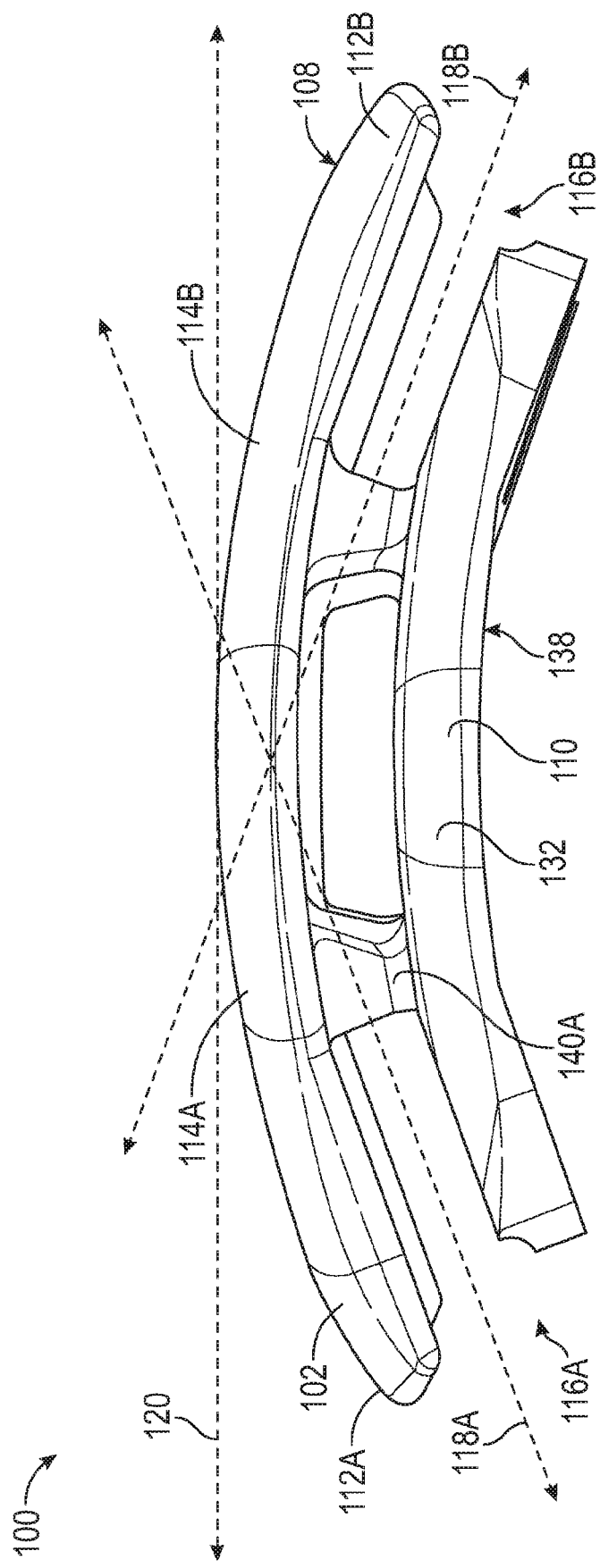
FIG. 2 is a side view of the slider cover of FIG. 1.
Figure 6:
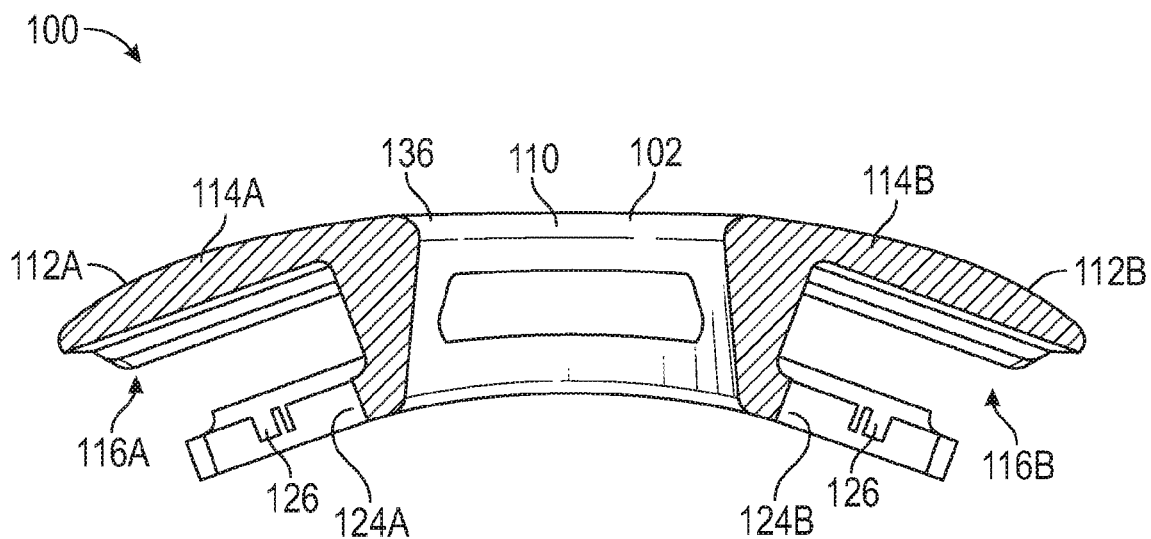
FIG. 6 is a sectional view of the slider cover of FIG. 1 taken along line 6-6 in FIG. 3.
Figure 7:
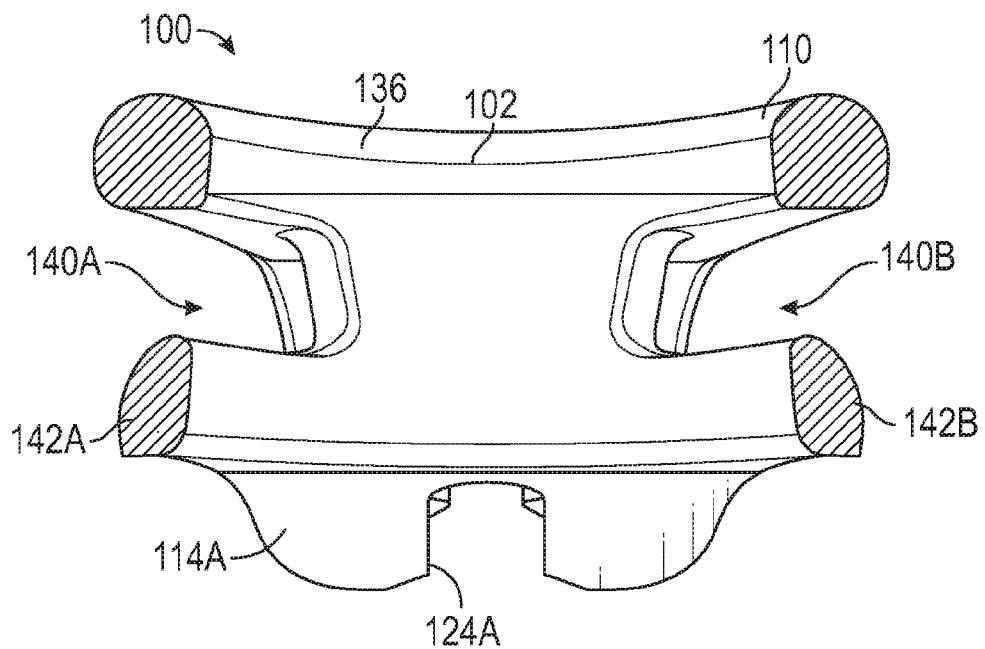
FIG. 7 is a sectional view of the slider cover of FIG. 1 taken along line 7-7 in FIG. 3.
Figure 8:
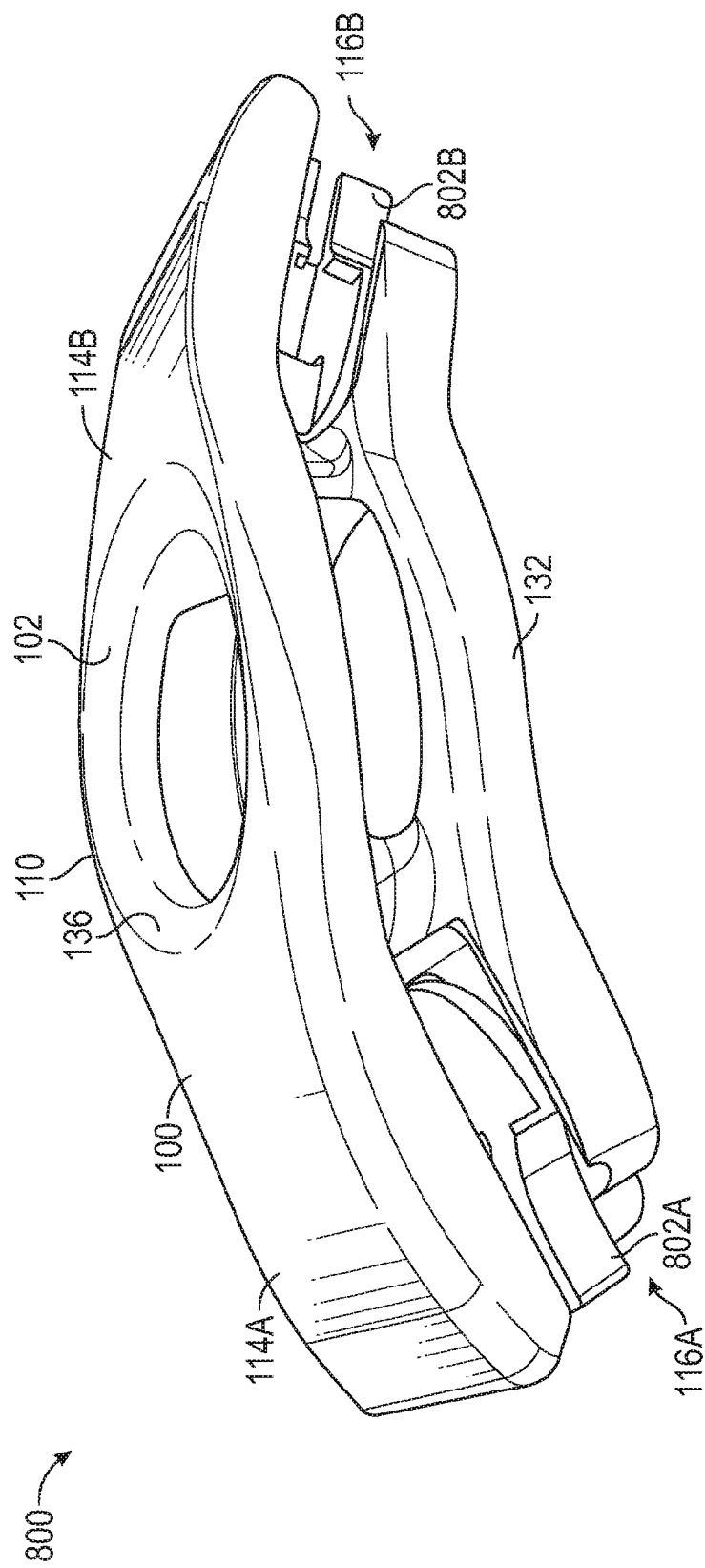
FIG. 8 is a perspective view of a slider cover assembly according to aspects of the current disclosure including the slider cover of FIG. 1, a first slider, and a second slider.
Figure 9:
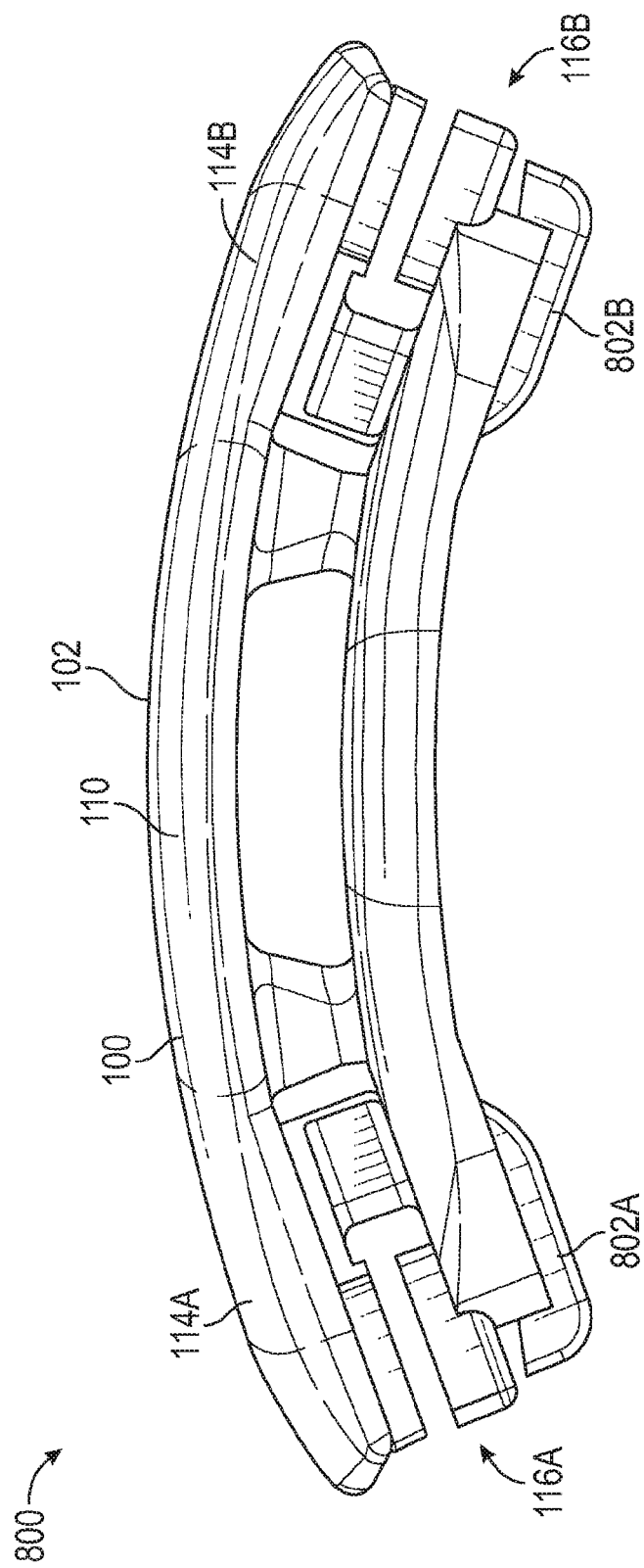
FIG. 9 is a side view of the slider cover assembly of FIG. 8.
Figure 10:
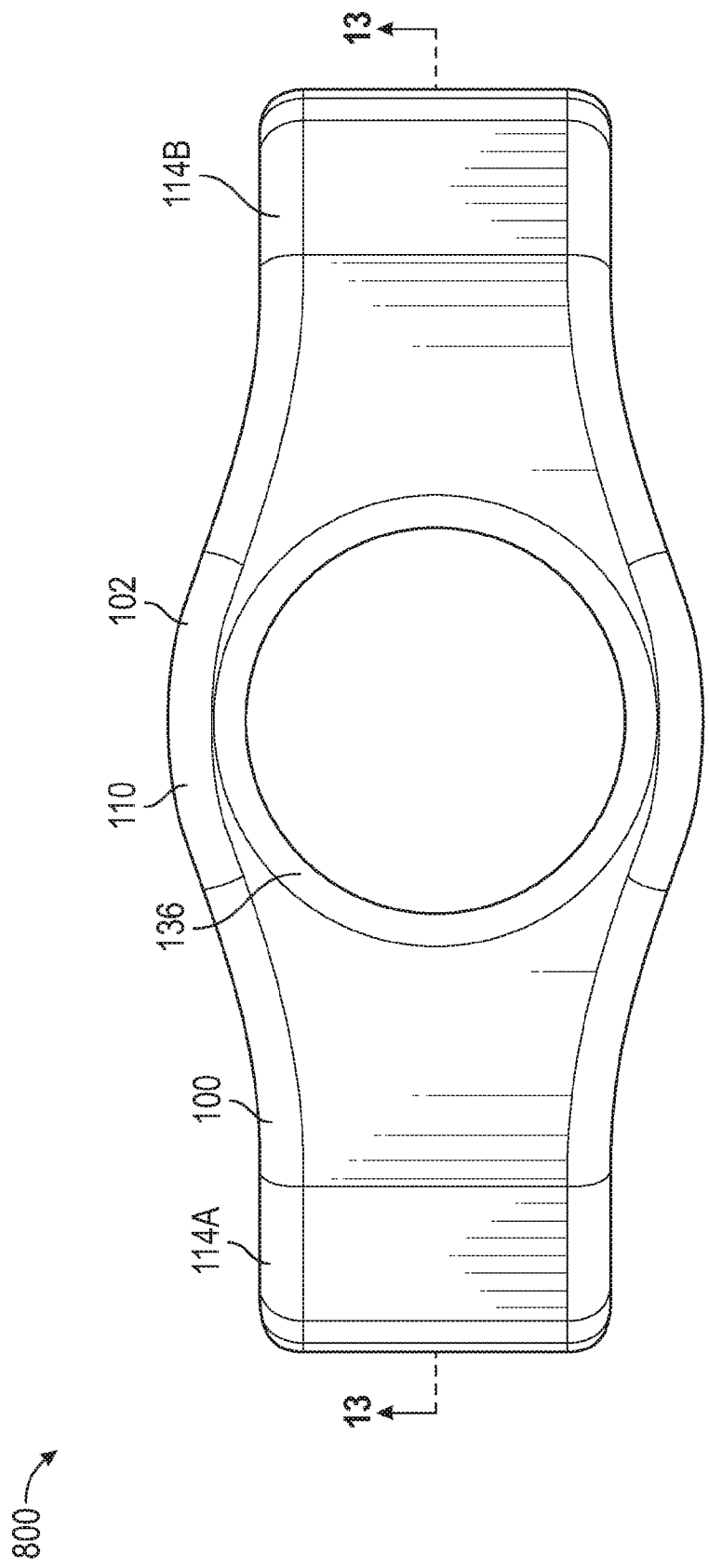
FIG. 10 is a top view of the slider cover assembly of FIG. 8.
Figure 11:
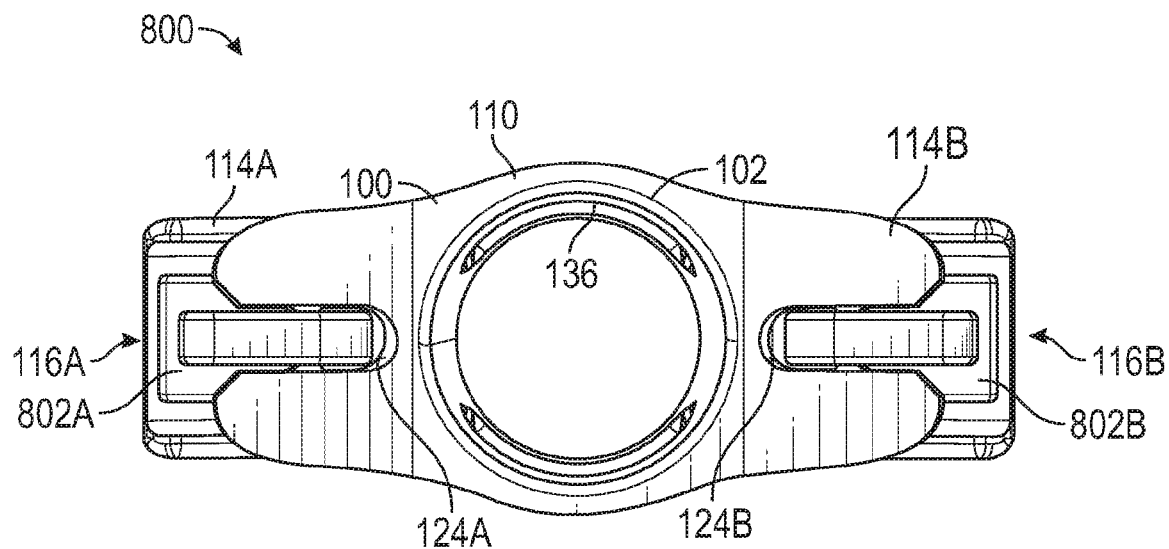
FIG. 11 is a bottom view of the slider cover assembly of FIG. 8.
Figure 12:
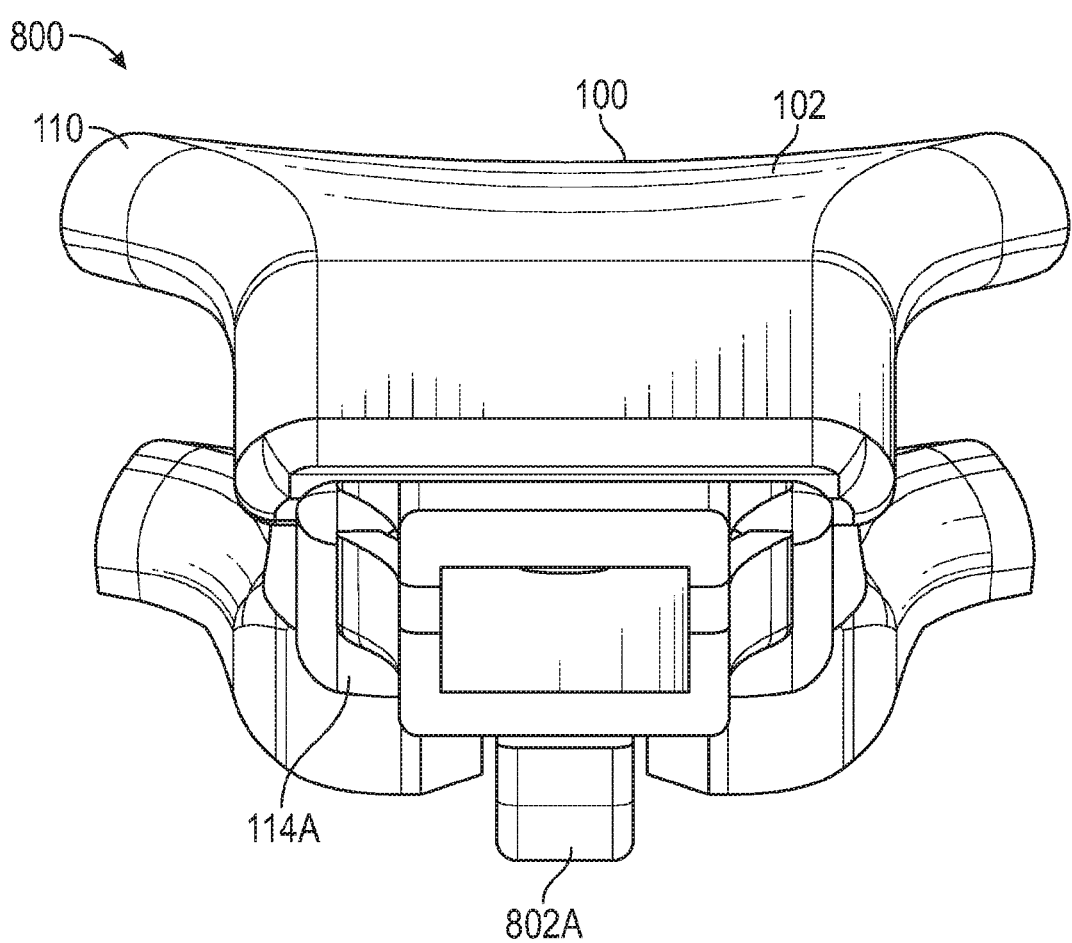
FIG. 12 is an end view of the slider cover assembly of FIG. 8.
Figure 24:
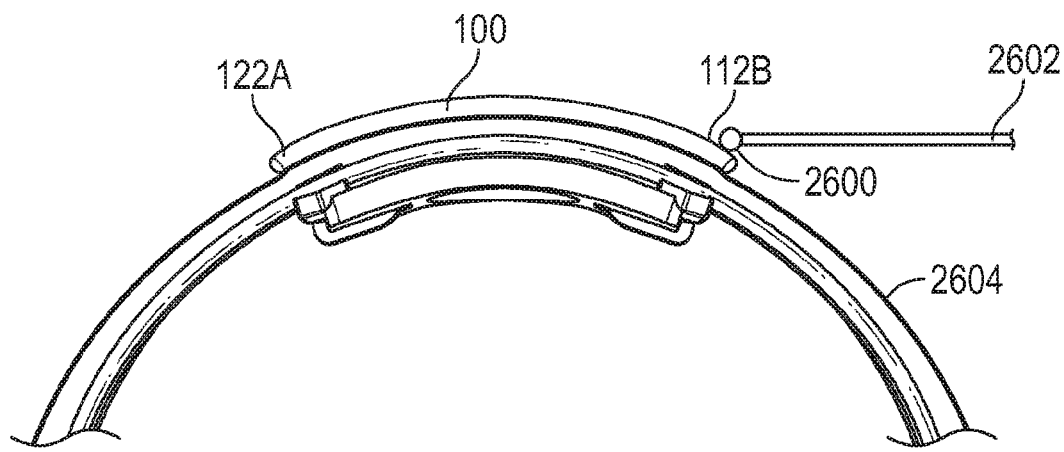
FIG. 24 is a side view of the slider cover of FIG. 1 on a fastening tape with a portion of the slider cover extending beneath a portion of a covering layer.

As best illustrated in FIGS. 2 and 6, in various examples, the body 102 includes a taper or continuous radius 112A between the middle portion 110 and the first end 104. The taper or continuous radius 112A extends to the first end 104 such that a thickness of the body 102 at the first end 104 is less than a thickness of the body 102 at the middle portion 110. Similarly, in some examples, the body 102 includes a taper or continuous radius 112B between the middle portion 110 and the second end 106. The taper or continuous radius 112B extends to the second end 106 such that a thickness of the body 102 at the second end 106 is less than the thickness of the body 102 at the middle portion 110. In various examples, the thickness of the body 102 at the first end 104 is the same as the thickness of the body 102 at the second end 106, although it need not be. Through the taper or continuous radius 112A and/or the taper or continuous radius 112B, at least a portion of the slider cover 100 on a fastening tape can dive under a fabric to bring the middle portion 110 closer to the fabric. For example, FIG. 24 illustrates a non-limiting example of how the taper or continuous radius 112B allows a portion of the slider cover 100 to dive under a seam 2600 of a fabric 2602 covering a fastening tape 2604. In other cases, tapers or continuous radii 112A-112B are not present and the thickness of the first end 104 and the second end 106 is generally the same as the thickness of the middle portion 110.

In various examples, the slider cover 100 includes a first slider-receiving portion 114A between the middle portion 110 and the first end 104 and a second slider-receiving portion 114B between the middle portion 110 and the second end 106. The first slider-receiving portion defines a first slider-receiving area 116A, and the second slider-receiving portion 114B defines a second slider-receiving area 116B. As described in detail below, the first slider-receiving portion 114A is configured to retain a first slider and the second slider-receiving portion 114B is configured to retain a second slider.

As illustrated in FIG. 2, the first slider-receiving portion 114A includes a centerline 118A extending at an angle with respect to a horizontal plane 120 of the slider cover 100. As illustrated in FIG. 2, the horizontal plane 120 can be a plane that is tangent to the top surface 108 at the center of the middle portion 110. In a similar manner, the second slider-receiving portion 114B includes a centerline 118B extending at an angle with respect to the horizontal plane 120 of the slider cover 100. In various examples, the angles are non-zero angles such that the centerlines 118A-B of the respective slider-receiving portions 114A-B are not parallel to the horizontal plane 120. In some examples, the angles between the centerlines 118A-B and the horizontal plane 120 are from about 0° to about 90°. In various cases, the angles between the centerlines 118A-B and the horizontal plane 120 are about 45°. In other examples, the angles between the centerlines 118A-B and the horizontal plane 120 are less than 45°. In other examples, the angles between the centerlines 118A-B and the horizontal plane 120 may be varied or selected depending on a path of a fastening tape on which the slider cover 100 is installed. In various examples, the centerlines 118A-B intersect one another within the body 102, such as within the middle portion 110 of the body 102, although they need not. In some examples, the centerlines 118A-B each intersect the top surface 108 of the body 102, although they need not. In some examples, the angles between the centerlines 118A-B and the horizontal plane 120 are substantially the same, although they need not be. In some examples, the slider-receiving portions 114A-B are positioned symmetrically with respect to a shaft opening 136 at the center of the body 102. In other examples, depending on the movable range of the shaft that extends through the shaft opening 136 (see, e.g., FIG. 19), the curvature of the shaft, and/or the mechanism of the shaft, the slider-receiving portions 114A-B may be asymmetrical.

Referring to FIGS. 1 and 4-6, the slider-receiving portions 114A-B each include a locking slot 124A-B or similar locking feature. The locking slots 124A-B engage with portions of sliders to retain the sliders in the slider-receiving areas 116A-B (see FIGS. 8, 9 and 11-14). In various examples, the locking slots 124A-B limit movement of sliders in an x-direction 129 and a y-direction 131 (see FIG. 4) while allowing for rotation or tilting of the sliders. In certain cases, each locking slot 124A-B guides installation of the slider from a single direction (e.g., from an end of the slider cover assembly) during assembly of a slider cover assembly 800 (see FIGS. 8-14).

In some optional examples, each locking slot 124A-B includes one or more locking tabs 126. In various examples, the locking tabs 126 provide a snap-fit connection with the sliders in the slider-receiving areas 116A-B. In certain cases, the locking tabs 126 define a rotation axis for the sliders such that the sliders can rotate within the slider-receiving areas 116A-B relative to the slider cover 100. In various examples, the locking tabs 126 provide an alert or indication that a slider is positioned within the respective slider-receiving area 116A-B. As one non-limiting example, the alert or indication may be an audible alert, such as a click, pop, snap, etc. Various other types of audible alerts or other alerts or indications may be provided. In some examples, various other securing mechanisms may be used to retain the sliders within the slider-receiving areas 116A-B, including, but not limited to, pins, bolts, clips, clasps, hooks, loops, screws, or various other suitable securing mechanisms.

Figure 3:
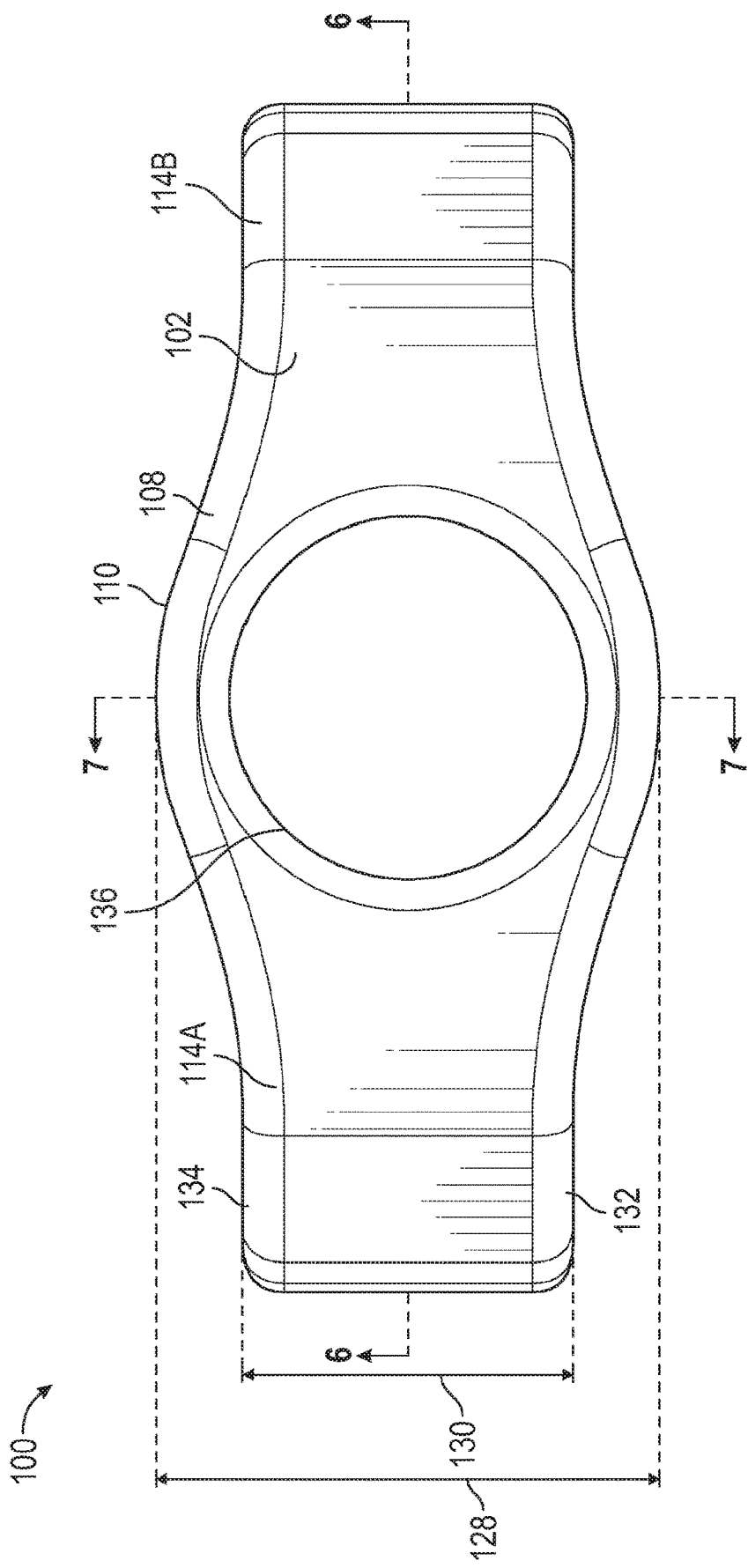
FIG. 3 is a top view of the slider cover of FIG. 1.
Figure 4:
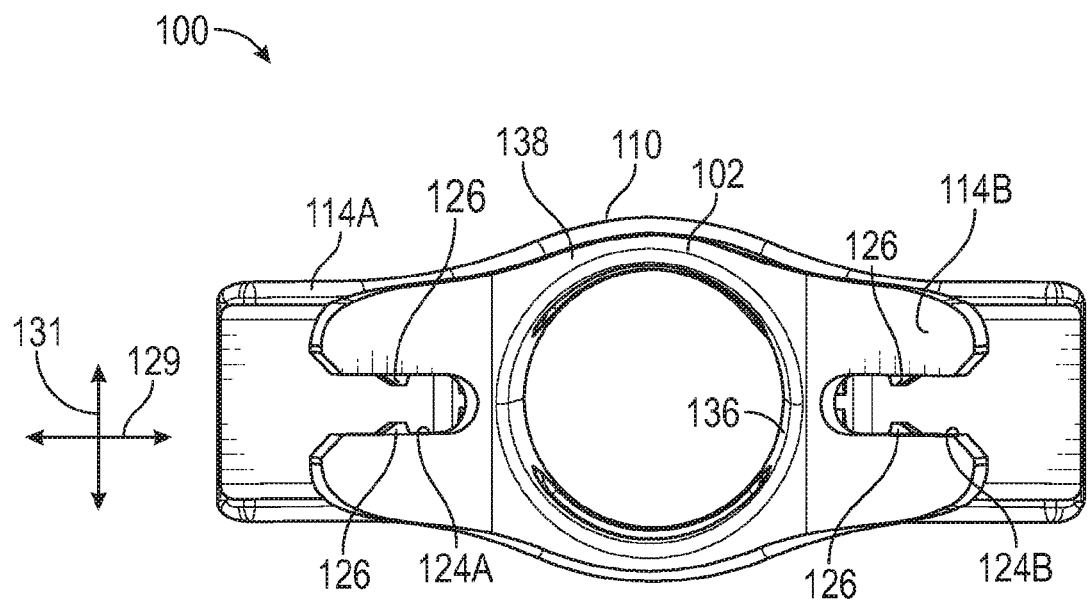
FIG. 4 is a bottom view of the slider cover of FIG. 1.

Referring to FIG. 3, in some examples, the middle portion 110 has a width 128 that is greater than a width 130 of the first end 104 and the second end 106 of the body 102. In certain cases, the body 102 includes a first side 132 that extends from the first end 104 to the second end 106, and a second side 134 opposite the first side 132. As illustrated in FIG. 3, in various optional examples, the first side 132 and the second side 134 at the middle portion 110 are arcuate shaped, although they need not be.

In certain examples, the middle portion 110 defines the shaft opening 136 extending through the body 102 from the top surface 108 to the bottom surface 138 of the body 102. In some examples, the shaft opening 136 is tapered such that the shaft opening 136 increases or decreases in size as it extends from the top surface 108 to the bottom surface 138 (see FIG. 6). As one non-limiting example, the shaft opening 136 may be tapered when the shaft to be accommodated within the shaft opening 136 is not straight or is off-center from a rotation point of the shaft. In other examples, the shaft opening 136 is not tapered. For example, in one non-limiting case, the shaft opening 136 may be cylindrically shaped. The shape and size of the shaft opening 136 may be varied depending on a shape and size of a shaft that the shaft opening 136 is configured to accommodate.

Figure 5:
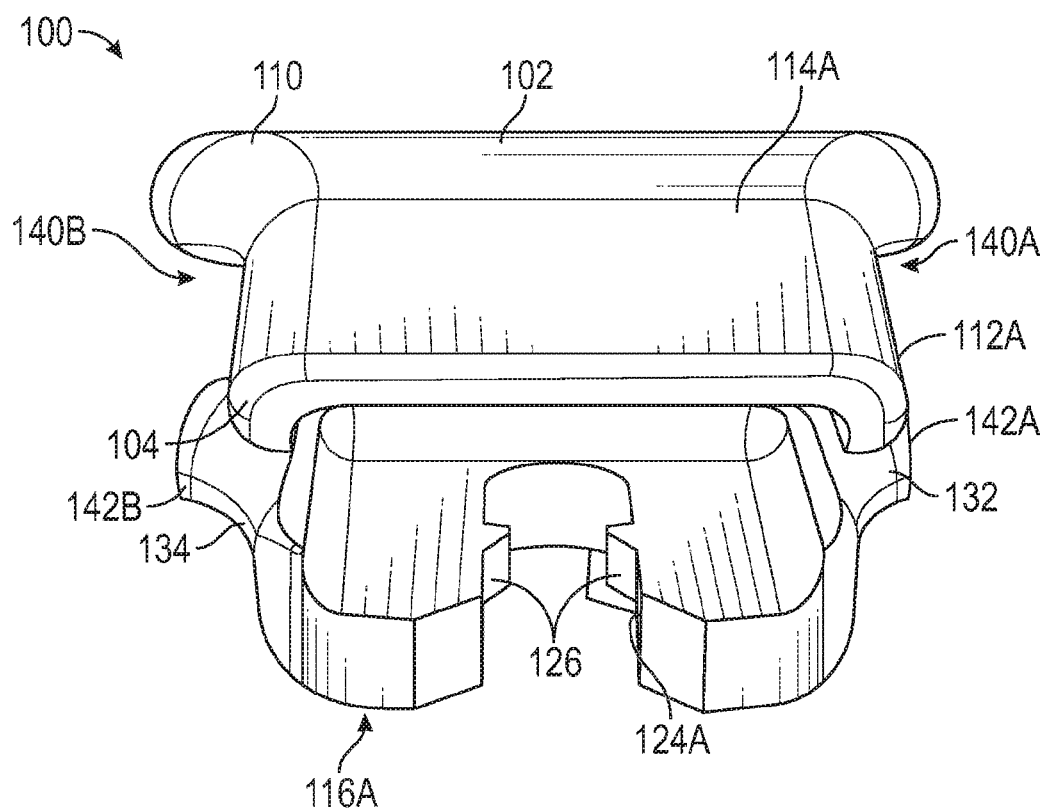
FIG. 5 is an end view of the slider cover of FIG. 1.

As illustrated in FIGS. 1, 2, 5, and 7, the body 102 of the slider cover 100 defines a first guiding channel 140A and a second guiding channel 140B. The guiding channels 140A-B guide zipper elements of a fastening tape as the slider cover 100 is positioned and moved along the fastening tape. In some examples, as illustrated in FIG. 5, a portion 142A of the first side 132 between the first guiding channel 140A and the bottom surface 138 is arcuate shaped and a portion 142B of the second side 134 between the second guiding channel 140B and the bottom surface 138 is arcuate shaped. In certain examples, these arcuate shaped portions 142A-B minimize an interference between the disengaged (opened) zipper elements of the fastener tape and the slider cover 100 to guide the elements in a more natural direction, which facilitates the smooth opening and closing of the zipper elements (e.g., the elements may fit along the curved surfaces). In other examples, the portions 142A-B may not be arcuate shaped and may have any shape as desired. In some examples, the guiding channels 140A-B extend from the first end 104 to the second end 106. In other examples, the guiding channels 140A-B extend from the first slider-receiving portion 114A to the second slider-receiving portion 114B.

Figure 13:
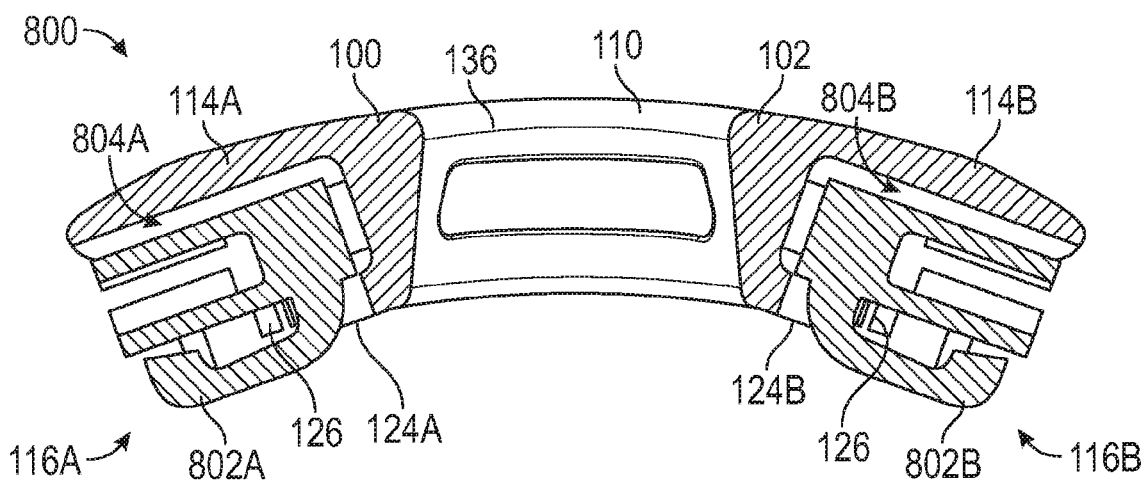
FIG. 13 is a sectional view of the slider cover assembly of FIG. 8 taken along line 13-13 in FIG. 10.
Figure 14:
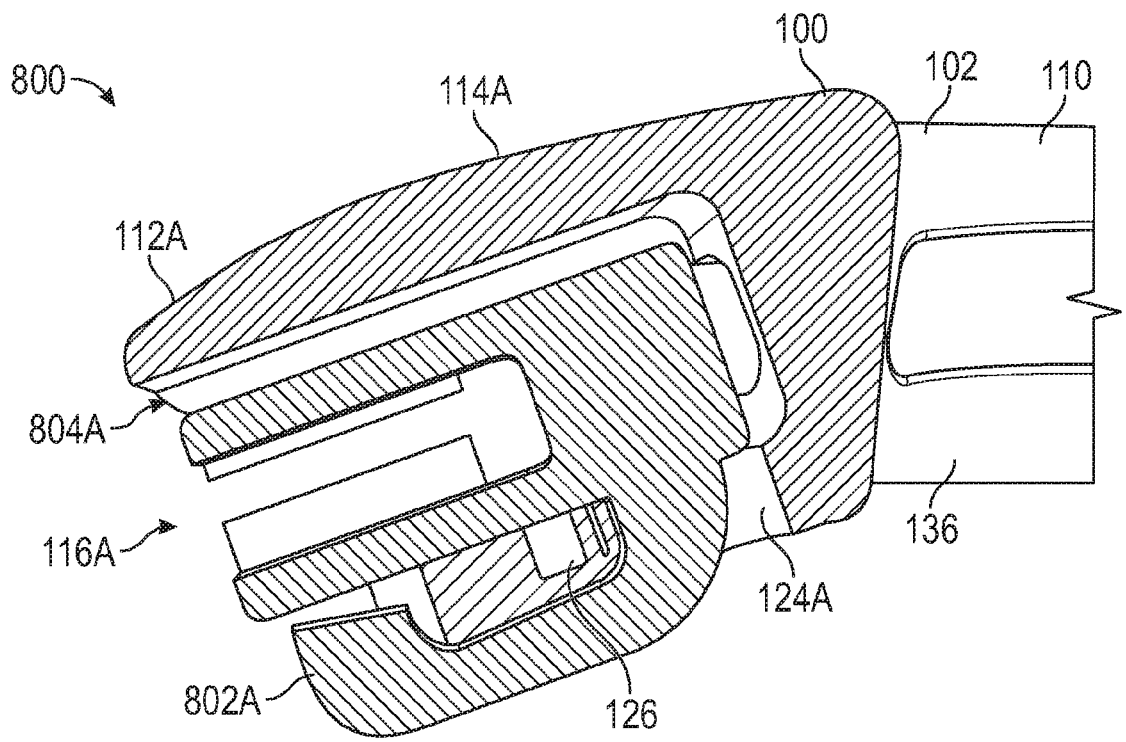
FIG. 14 is an enlarged sectional view of the slider cover assembly of FIG. 8 taken along line 13-13 in FIG. 10.

FIGS. 8-14 illustrate an example of the slider cover assembly 800 that includes the slider cover 100, a first slider 802A, and a second slider 802B. The first slider 802A is retained within the first slider-receiving area 116A and the second slider 802B is retained within the second slider-receiving area 116B. As illustrated in FIGS. 13 and 14, the first slider-receiving area 116A defines a clearance 804A between the first slider 802A and the body 102 when the first slider 802A is positioned within the first slider-receiving area 116A. Through the clearance 804A, the first slider 802A can rotate or tilt a predetermined amount about a rotation axis (e.g., defined by the locking tabs 126) while retained within the first slider-receiving area 116A. The second slider-receiving area 116B includes a similar clearance 804B such that the second slider 802B can rotate or tilt while retained within the second slider-receiving area 116B. In various optional examples, a cutout, groove, channel, or other similar feature defined in the body 102 may provide the clearances 804A-B. The rotatably supported sliders 802A-B provide flexibility to the angles of the centerlines 118A-B such that the slider cover assembly 800 can move along fastening tapes extending at various angles relative to the horizontal plane 120, even if those angles do not exactly match the angles of the centerlines 118A-B.

Figure 15:
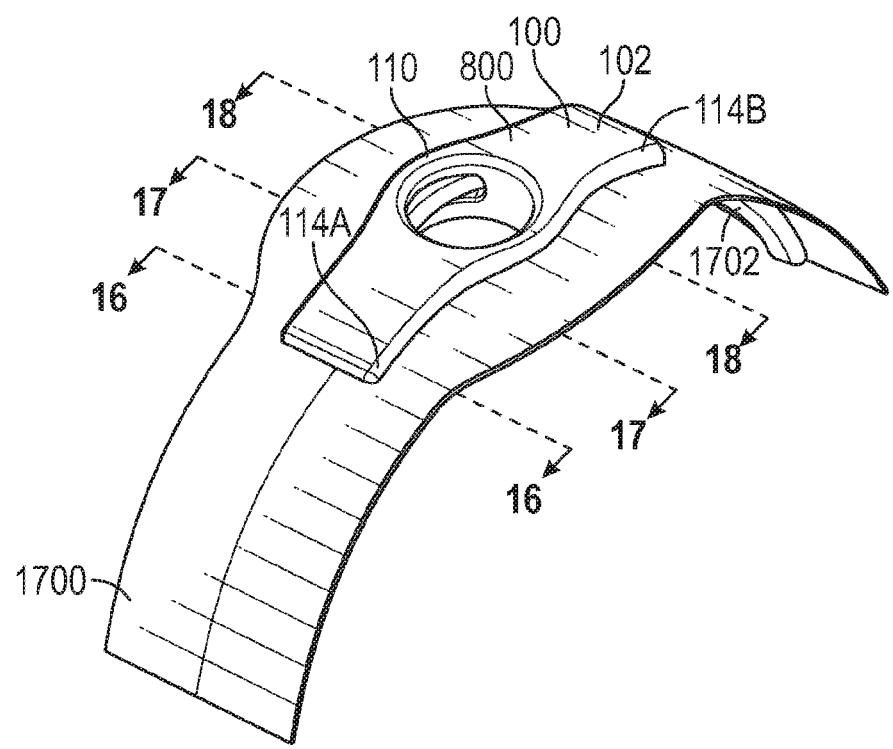
FIG. 15 is a perspective view of the slider cover assembly of FIG. 8 on a fastening tape.

FIGS. 15-18 illustrate the slider cover assembly 800 on a fastening tape 1700 that includes zipper elements 1702. As illustrated in FIG. 15, the fastening tape 1700 is curved in a z-direction such that portions of the fastening tape 1700 extend in at least two planes. In various examples, the angled slider-receiving areas 116A-B (and optionally the tilting of the sliders 802A-B) allow the slider cover assembly 800 to smoothly open and close the zipper elements 1702 as the slider cover assembly 800 moves along the fastening tape 1700.

Figure 16:
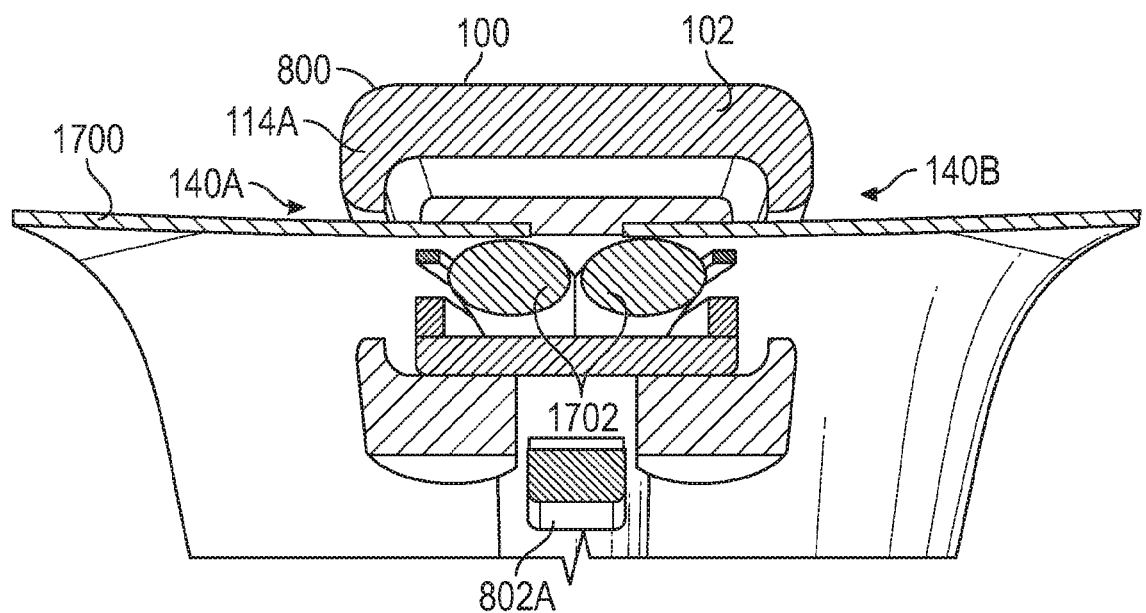
FIG. 16 is a sectional view of the slider cover assembly and fastening tape of FIG. 15 taken along line 16-16 in FIG. 15.
Figure 17:
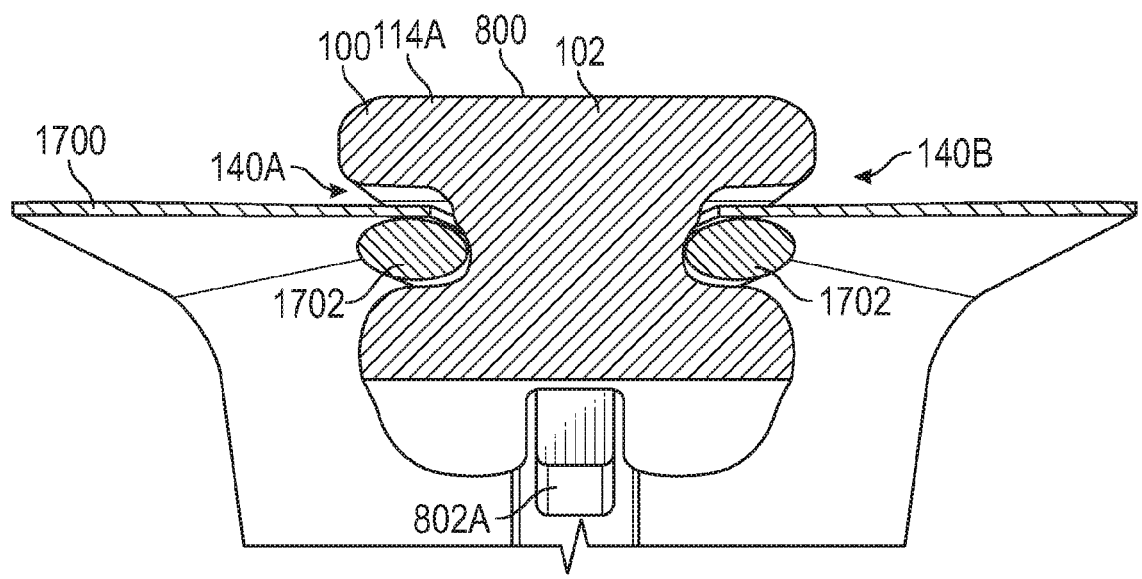
FIG. 17 is a sectional view of the slider cover assembly and fastening tape of FIG. 15 taken along line 17-17 in FIG. 15.
Figure 18:
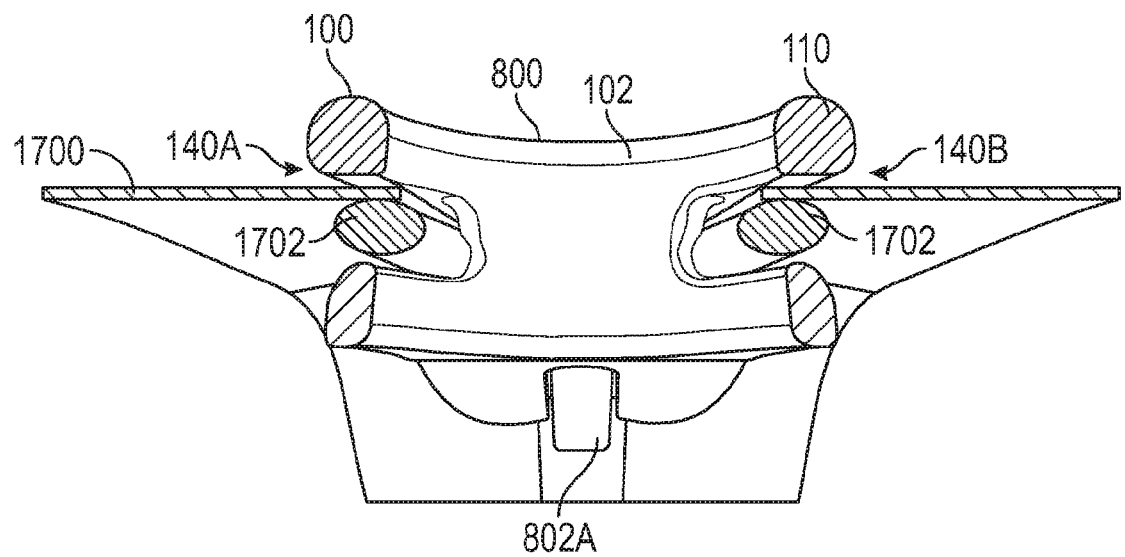
FIG. 18 is a sectional view of the slider cover assembly and fastening tape of FIG. 15 taken along line 18-18 in FIG. 15.

In various examples, the sliders 802A-B are arranged such that during movement along the fastening tape 1700, one slider closes the zipper elements 1702, the other slider opens the zipper elements 1702, and the middle portion 110 of the slider cover 100 maintains an opening through the fastening tape 1700 between the sliders 802A-B. FIGS. 16-18 illustrate the guiding channels 140A-B guiding the fastening tape 1700 and zipper elements 1702 and the slider cover 100 opening the zipper elements 1702 to create the opening in the fastening tape 1700 (e.g., to receive a shaft or other component).

Figure 19:
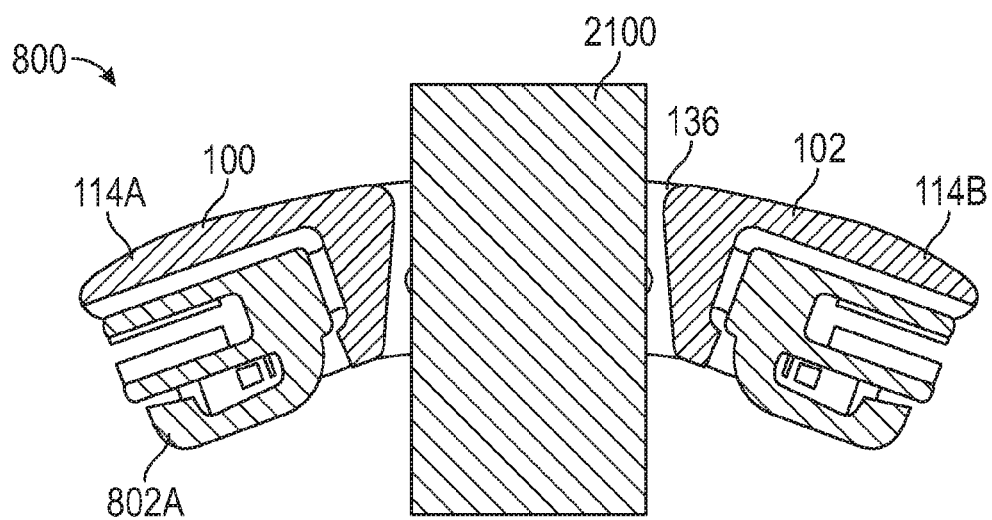
FIG. 19 is a sectional view of the slider cover assembly of FIG. 8 taken along line 13-13 in FIG. 10 with a support shaft extending through the slider cover.

FIG. 19 illustrates the slider cover assembly 800 with a shaft 2100 extending through the shaft opening 136. In various examples, the shaft 2100 may be a component of a headrest frame 2302 for a passenger seat 2300 (see FIG. 21). In other examples, the shaft 2100 may be a component of various other items or devices that need to extend through the fastening tape 1700 and be movable along the fastening tape 1700.

Figure 20:
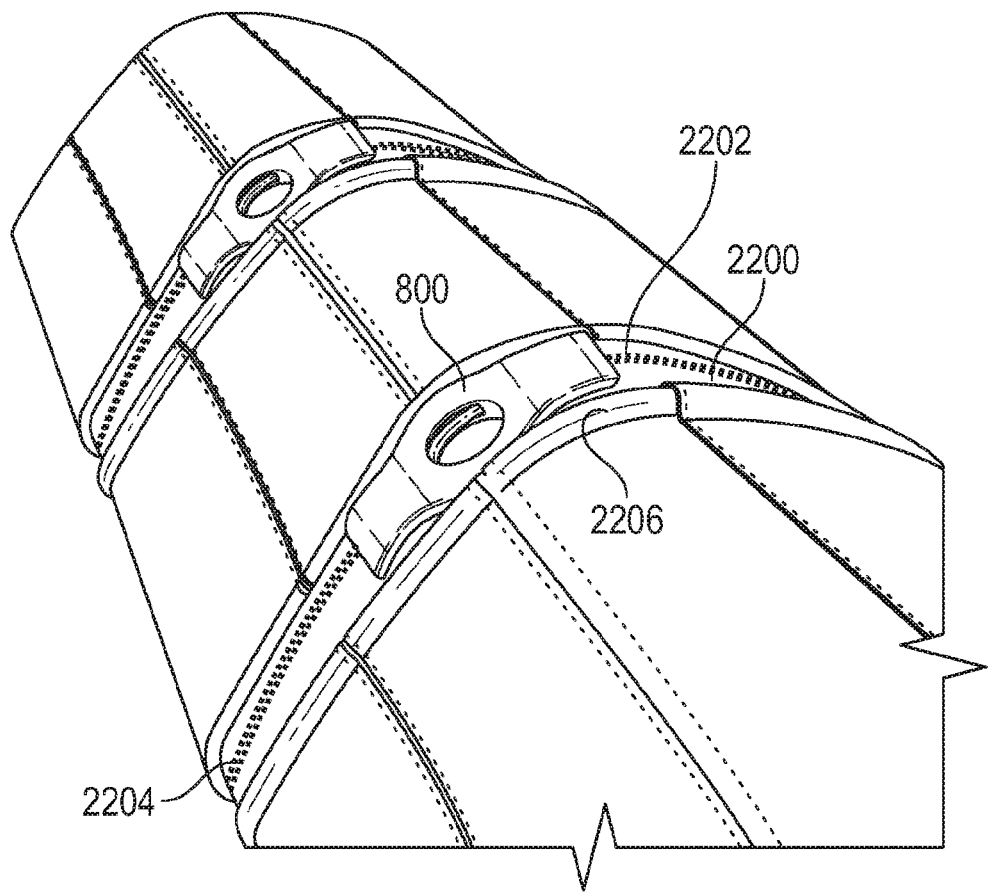
FIG. 20 is a perspective view of the slider cover assembly of FIG. 8 on a fastening tape positioned on a passenger seat.

FIG. 20 illustrates the slider cover assembly 800 assembled on another fastening tape 2200. As illustrated in FIG. 20, the fastening tape 2200 generally includes a first portion 2202 extending in a first plane and a second portion 2204 extending in a second plane, and a curved portion 2206 between the first portion 2202 and the second portion 2204.

Figure 21:
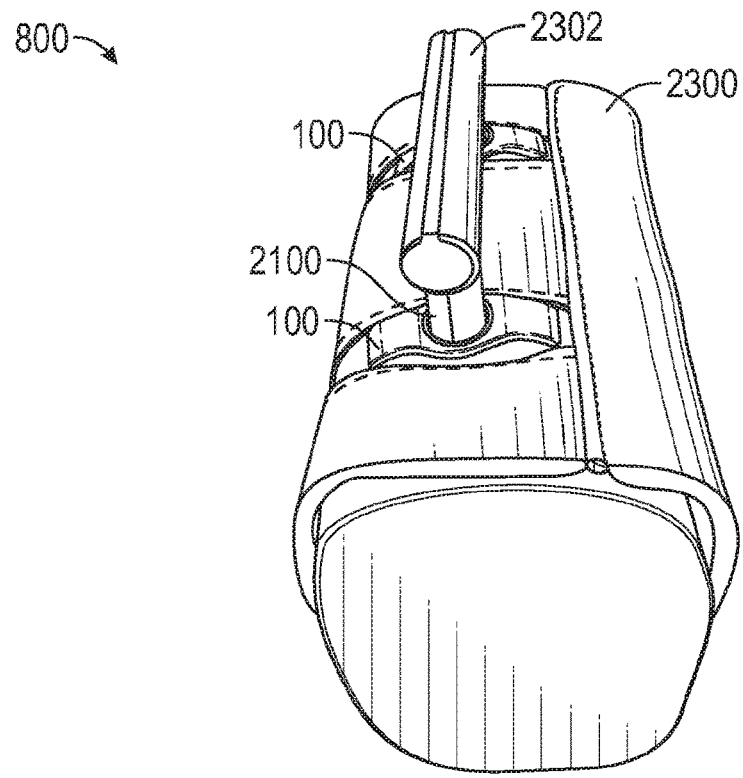
FIG. 21 is a perspective view of portion of a passenger seat with the slider cover assembly of FIG. 8, the fastening tape of FIG. 20, and a headrest frame in a first position.
Figure 22:
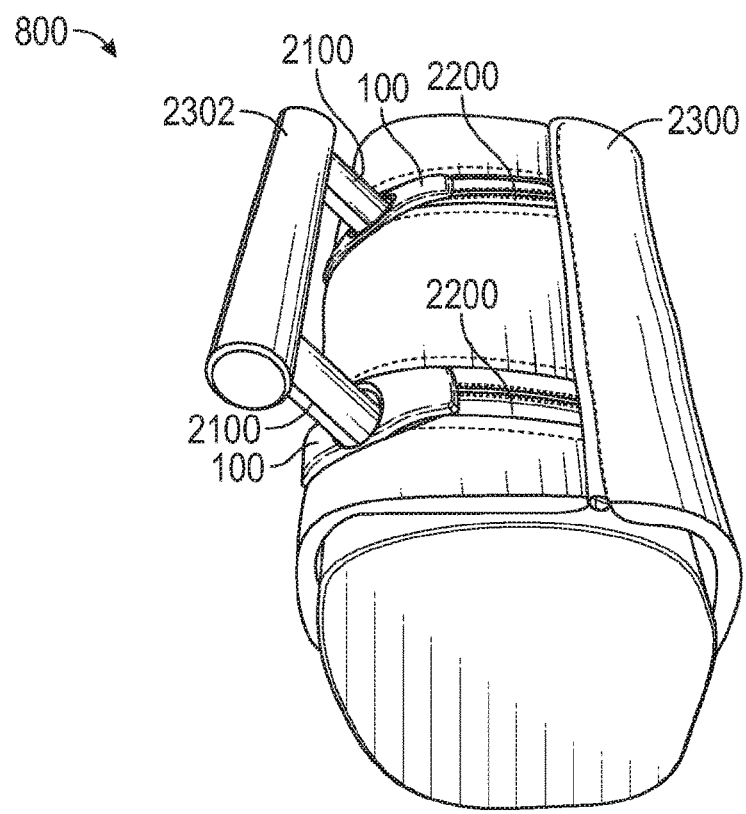
FIG. 22 is a perspective view of the portion of the passenger seat of FIG. 21 with the headrest frame in a second position.
Figure 23:
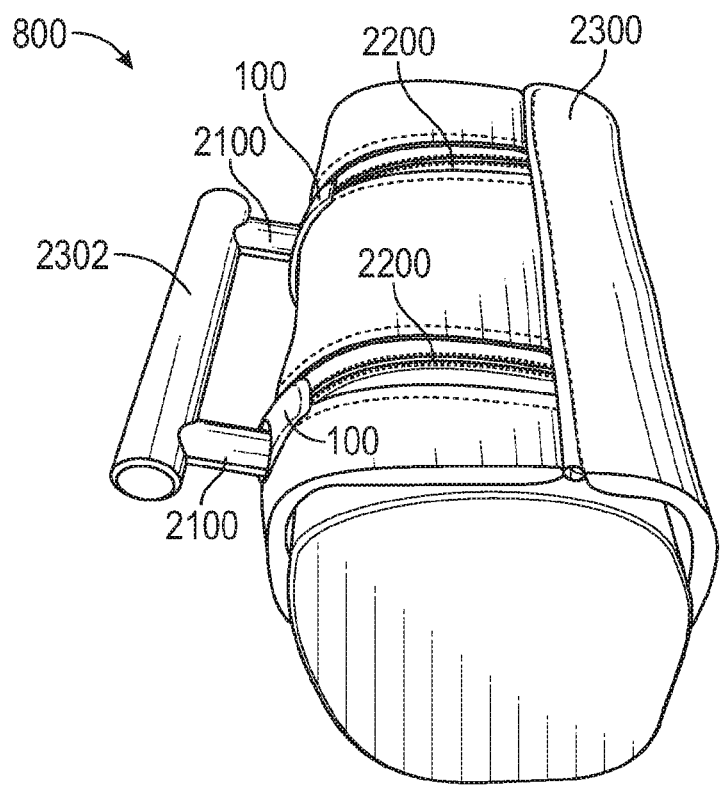
FIG. 23 is a perspective view of the portion of the passenger seat of FIG. 21 with the headrest frame in a third position.

FIGS. 21-23 illustrate an example of slider cover assemblies 800 on two fastening tapes 2200 on a portion of the passenger seat 2300. The shafts 2100 form portions of the headrest frame 2302 and extend through the slider covers 100 (and through the openings in the fastening tapes 2200 created by the slider covers 100). Through the slider cover assemblies 800, the headrest frame 2302 is movable to various positions relative to the passenger seat 2300, including along curved portions, while the remaining portions of the fastenings tapes 2200 are closed.

FIG. 24 illustrates an example of how the taper or continuous radius 112B allows a portion of the slider cover 100 to dive under the seam 2600 of the fabric 2602 covering the fastening tape 2604.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A slider assembly comprising: a slider cover comprising: a body having a first end and a second end opposite the first end, wherein the first end and the second end are arranged in a direction of travel of the slider cover; a first slider-receiving area at the first end and having a centerline extending at a non-parallel angle with respect to a horizontal plane of the slider cover; and a second slider-receiving area at the second end and having a centerline extending at a non-parallel angle with respect to the horizontal plane of the slider cover; a first slider retained by the first slider-receiving area; and a second slider retained by the second slider-receiving area.

EC 2. The slider assembly of any of the preceding or subsequent example combinations, wherein the body of the slider cover further comprises: a top surface extending from the first end to the second end, wherein the top surface comprises a middle portion between the first end and the second end, and wherein the middle portion of the top surface is vertically above the first end and the second end.

EC 3. The slider assembly of any of the preceding or subsequent example combinations, wherein a first portion of the top surface between the middle portion and the first end comprises a first taper extending to the first end such that a thickness of the body at the first end is less than a thickness of the body at the middle portion, and wherein a second portion of the top surface between the middle portion and the second end comprises a second taper extending to the second end such that a thickness of the body at the second end is less than the thickness of the body at the middle portion.

EC 4. The slider assembly of any of the preceding or subsequent example combinations, wherein the thickness of the body at the first end is the same as the thickness of the body at the second end.

EC 5. The slider assembly of any of the preceding or subsequent example combinations, wherein the body of the slider cover further comprises a middle portion between the first slider-receiving area and the second slider-receiving area.

EC 6. The slider assembly of any of the preceding or subsequent example combinations, wherein a width of the middle portion that extends transversely to the direction of travel of the slider cover is greater than a width of the body at the first end and greater than a width of the body at the second end.

EC 7. The slider assembly of any of the preceding or subsequent example combinations, wherein the body of the slider cover comprises a first side extending from the first end to the second end and a second side opposite the first side, and wherein the first side and the second side at the middle portion of the body are arcuate shaped.

EC 8. The slider assembly of any of the preceding or subsequent example combinations, wherein the middle portion defines a shaft opening extending through the body of the slider cover from a top side of the body to a bottom side of the body.

EC 9. The slider assembly of any of the preceding or subsequent example combinations, wherein the shaft opening is tapered as the shaft opening extends from the top side to the bottom side of the body.

EC 10. The slider assembly of any of the preceding or subsequent example combinations, wherein the body defines a first guiding channel extending along a first side of the body from the first end to the second end and a second guiding channel extending along a second side of the body from the first end to the second end, and wherein the first guiding channel and the second guiding channel are configured to guide zipper elements of a fastening tape.

EC 11. The slider assembly of any of the preceding or subsequent example combinations, wherein a portion of the first side between the first guiding channel and a bottom side of the body is arcuate shaped.

EC 12. The slider assembly of any of the preceding or subsequent example combinations, wherein the first slider is pivotally retained in the first slider-receiving area such that the first slider is at least partially rotatable relative to the body of the slider cover about a rotation axis that extends perpendicular to the direction of travel.

EC 13. The slider assembly of any of the preceding or subsequent example combinations, wherein the first slider-receiving area defines a first locking slot, wherein a portion of the first slider is retained within the first locking slot, and wherein the first locking slot limits movement of the first slider to the direction of travel.

EC 14. The slider assembly of any of the preceding or subsequent example combinations, wherein the first locking slot comprises an audible engagement feature configured to provide an audible alert when the portion of the first slider is retained within the first locking slot.

EC 15. The slider assembly of any of the preceding or subsequent example combinations, wherein the non-parallel angle between the centerline of the first slider-receiving area and the horizontal plane is less than 90 degrees.

EC 16. The slider assembly of any of the preceding or subsequent example combinations, wherein the centerline of the first slider-receiving area intersects the centerline of the second slider-receiving area.

EC 17. The slider assembly of any of the preceding or subsequent example combinations, wherein the non-parallel angle between the centerline of the first slider-receiving area and the horizontal plane is the same as the non-parallel angle between the centerline of the second slider-receiving area and the horizontal plane.

EC 18. A slider cover comprising: a body having a first end and a second end opposite the first end, wherein the first end and the second end are arranged in a direction of travel of the slider cover; a first slider-receiving area at the first end and having a centerline extending at a non-parallel angle with respect to a horizontal plane of the slider cover; and a second slider-receiving area at the second end and having a centerline extending at a non-parallel angle with respect to the horizontal plane of the slider cover.

EC 19. The slider cover of any of the preceding or subsequent example combinations, wherein the body of the slider cover further comprises: a top surface extending from the first end to the second end, wherein the top surface comprises a middle portion between the first end and the second end, and wherein the middle portion of the top surface is vertically above the first end and the second end.

EC 20. The slider cover of any of the preceding or subsequent example combinations, wherein a first portion of the top surface between the middle portion and the first end comprises a first taper extending to the first end such that a thickness of the body at the first end is less than a thickness of the body at the middle portion, and wherein a second portion of the top surface between the middle portion and the second end comprises a second taper extending to the second end such that a thickness of the body at the second end is less than the thickness of the body at the middle portion.

EC 21. The slider cover of any of the preceding or subsequent example combinations, wherein the body of the slider cover further comprises a middle portion between the first slider-receiving area and the second slider-receiving area.

EC 22. The slider cover of any of the preceding or subsequent example combinations, wherein a width of the middle portion that extends transversely to the direction of travel of the slider cover is greater than a width of the body at the first end and greater than a width of the body at the second end, wherein the body of the slider cover comprises a first side extending from the first end to the second end and a second side opposite the first side, and wherein the first side and the second side at the middle portion of the body are arcuate shaped.

EC 23. The slider cover of any of the preceding or subsequent example combinations, wherein the middle portion defines a shaft opening extending through the body of the slider cover from a top side of the body to a bottom side of the body.

EC 24. The slider cover of any of the preceding or subsequent example combinations, wherein the shaft opening is tapered as the shaft opening extends from the top side to the bottom side of the body.

EC 25. The slider cover of any of the preceding or subsequent example combinations, wherein the body defines a first guiding channel extending along a first side of the body from the first end to the second end and a second guiding channel extending along a second side of the body from the first end to the second end, and wherein the first guiding channel and the second guiding channel are configured to guide zipper elements of a fastening tape.

EC 26. The slider cover of any of the preceding or subsequent example combinations, wherein a portion of the first side between the first guiding channel and a bottom side of the body is arcuate shaped.

EC 27. The slider cover of any of the preceding or subsequent example combinations, wherein the centerline of the first slider-receiving area intersects the centerline of the second slider-receiving area, wherein the non-parallel angle between the centerline of the first slider-receiving area and the horizontal plane is less than 90 degrees, and wherein the non-parallel angle between the centerline of the first slider-receiving area and the horizontal plane is the same as the non-parallel angle between the centerline of the second slider-receiving area and the horizontal plane.

EC 28. A slider cover assembly comprising: a slider cover comprising a first slider-receiving area and a second slider-receiving area opposite the first slider-receiving area, wherein the first slider-receiving area and second slider-receiving area are arranged in a direction of travel of the slider cover, and wherein a centerline of the first slider-receiving area is non-parallel with a centerline of the second slider-receiving area; a first slider retained by the first slider-receiving area; and a second slider retained by the second slider-receiving area.

EC 29. The slider cover assembly of any of the preceding or subsequent example combinations, wherein the slider cover further comprises a middle portion between the first slider-receiving area and the second slider-receiving area, wherein the middle portion defines a shaft opening extending through the slider cover from a top side of the slider cover to a bottom side of the slider cover.

EC 30. The slider cover assembly of any of the preceding or subsequent example combinations, wherein a width of the middle portion is greater than a width of the first slider-receiving area and greater than a width of the second slider-receiving area.

EC 31. The slider cover assembly of any of the preceding or subsequent example combinations, wherein the first slider-receiving area defines a first locking slot, wherein a portion of the first slider is retained within the first locking slot, and wherein the first locking slot limits movement of the first slider to the direction of travel.

EC 32. The slider cover assembly of any of the preceding or subsequent example combinations, wherein the first locking slot comprises an audible engagement feature configured to provide an audible alert when the portion of the first slider is retained within the first locking slot.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A slider cover assembly comprising:
   a slider cover comprising:
      a body having a first end and a second end opposite the first end wherein the first end and the second end are arranged in a direction of travel of the slider cover;
      a first slider-receiving area at the first end and having a centerline extending at a non-parallel angle with respect to a horizontal plane of the slider cover; and
      a second slider-receiving area at the second end and having a centerline extending at a non-parallel angle with respect to the horizontal plane of the slider cover;
   a first slider retained by the first slider-receiving area; and
   a second slider retained by the second slider-receiving area,
   wherein the first slider-receiving area defines a first locking slot, wherein a portion of the first slider is retained within the first locking slot, and wherein the first locking slot limits movement of the first slider to the direction of travel, and
   the first locking slot is located on an opposite side of a top surface of the body.

2. The slider cover assembly of claim 1, wherein the body of the slider cover further comprises:
   the top surface extending from the first end to the second end,
   wherein the top surface comprises a middle portion between the first end and the second end, and
   wherein the middle portion of the top surface is vertically above the first end and the second end.

3. The slider cover assembly of claim 1, wherein a first slider-receiving portion between the middle portion and the first end comprises a first taper extending to the first end such that a thickness of the body at the first end is less than a thickness of the body at the middle portion, and wherein a second slider-receiving portion between the middle portion and the second end comprises a second taper extending to the second end such that a thickness of the body at the second end is less than the thickness of the body at the middle portion.

4. The slider cover assembly of claim 1, wherein the thickness of the body t the first end is the same as the thickness of the body at the second end.

5. The slider cover assembly of claim 1, wherein the body of the slider cover further comprises a middle portion between the first slider-receiving area and the second slider-receiving area.

6. The slider cover assembly of claim 5, wherein a width of the middle portion that extends transversely to the direction of travel of the slider cover is greater than a width of the body at the first end and greater than a width of the body at the second end.

7. The slider cover assembly of claim 5, wherein the middle portion defines a shaft opening extending through the body of the slider cover from a top side of the body to a bottom side of the body.

8. The slider cover assembly of claim 5, wherein the body defines a first guiding channel extending along a first side of the body from the first end to the second end and a second guiding channel extending along a second side of the body from the first end to the second end, and wherein the first guiding channel and the second guiding channel are configured to guide zipper elements of a fastening tape.

9. The slider cover assembly of claim 1, wherein the first slider is pivotally retained in the first slider-receiving area such that the first slider is at least partially rotatable relative to the body of the slider cover about a rotation axis that extends perpendicular to the direction of travel.

10. A slider cover comprising:
a body having a first end and a second end opposite the first end, wherein the first end and the second end are arranged in a direction of travel of the slider cover;
a first slider-receiving area at the first end and having a centerline extending at a non-parallel angle with respect to a horizontal plane of the slider cover; and
a second slider-receiving area at the second end and having a centerline extending at a non-parallel angle with respect to the horizontal plane of the slider cover,
wherein the first slider-receiving area defines a first locking slot, wherein the slider cover is configured to receive and retain a portion of a first slider within the first locking slot, and wherein the first locking slot is configured to limit movement of the first slider to the direction of travel, and
the first locking slot is located on an opposite side of a top surface of the body.

11. The slider cover of claim 10, wherein the body of the slider cover further comprises:
the top surface extending from the first end to the second end, the top surface comprising a middle portion between the first end and the second end;
a first slider-receiving portion between the middle portion and the first end, the first slider-receiving portion comprising a first taper extending to the first end such that a thickness of the body at the first end is less than a thickness of the body at the middle portion;
a second slider-receiving portion between the middle portion and the second end, the second slider-receiving portion comprising a second taper extending to the second end such that a thickness of the body at the second end is less than the thickness of the body at the middle portion;
a first guiding channel extending along a first side of the body from the first end to the second end; and
a second guiding channel extending along a second side of the body from the first end to the second end,
wherein the middle portion of the top surface is vertically above the first end and the second end, and
wherein the first guiding channel and the second guiding channel are configured to guide zipper elements of a fastening tape.

12. The slider cover of claim 10, wherein the body of the slider cover further comprises a middle portion between the first slider-receiving area and the second slider-receiving area, and wherein the middle portion defines a shaft opening extending through the body of the slider cover from a top side of the body to a bottom side of the body.

13. The slider cover of claim 12, wherein a width of the middle portion that extends transversely to the direction of travel of the slider cover is greater than a width of the body at the first end and greater than a width of the body at the second end, wherein the body of the slider cover comprises a first side extending from the first end to the second end and a second side opposite the first side, and wherein the first side and the second side at the middle portion of the body are arcuate shaped.

14. The slider cover of claim 10, wherein the centerline of the first slider-receiving area intersects the centerline of the second slider-receiving area, wherein the non-parallel angle between the centerline of the first slider-receiving area and the horizontal plane is less than 90 degrees, and wherein the non-parallel angle between the centerline of the first slider-receiving area and the horizontal plane is the same as the non-parallel angle between the centerline of the second slider-receiving area and the horizontal plane.

15. A slider cover assembly comprising:
a slider cover comprising a first slider-receiving area and a second slider-receiving area opposite the first slider-receiving area, wherein the first slider-receiving area and second slider-receiving area are arranged in a direction of travel of the slider cover, and wherein a centerline of the first slider-receiving area is non-parallel with a centerline of the second slider-receiving area;
a first slider retained by the first slider-receiving area; and
a second slider retained by the second slider-receiving area,
wherein the first slider-receiving area defines a first locking slot, wherein a portion of the first slider is retained within the first locking slot, and wherein the first locking slot limits movement of the first slider to the direction of travel, and
the first locking slot is located on an opposite side of a top surface of the body.

16. The slider cover assembly of claim 15, wherein the slider cover further comprises a middle portion between the first slider-receiving area and the second slider-receiving area, wherein the middle portion defines a shaft opening extending through the slider cover from a top side of the slider cover to a bottom side of the slider cover.

17. The slider cover assembly of claim 16, wherein a width of the middle portion is greater than a width of the first slider-receiving area and greater than a width of the second slider-receiving area.

18. The slider cover assembly of claim 15, wherein the first locking slot comprises an audible engagement feature configured to provide an audible alert when the portion of the first slider is retained within the first locking slot.

* * * * *

UNITED STATES PATENT AND TRADEMARK OFFICE
CERTIFICATE OF CORRECTION

PATENT NO. : 11,129,452 B2
APPLICATION NO. : 16/629434
DATED : September 28, 2021
INVENTOR(S) : Tetsuya Yoshino et al.

It is certified that error appears in the above-identified patent and that said Letters Patent is hereby corrected as shown below:

In the Claims

In Column 10, Line 66, in Claim 4, delete "t the" and insert -- at the --, therefor.

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*